A. C. BRANTINGHAM.

CONTROL DEVICE FOR SIFTERS.

APPLICATION FILED NOV. 16, 1909.

Reissued Dec. 21, 1909.

13,058.

WITNESSES

M. E. Kirk

Hazel Kirk

INVENTOR

Allen C. Brantingham

By Geo. Kirk

ATTORNEY.

UNITED STATES PATENT OFFICE.

ALLEN C. BRANTINGHAM, OF TOLEDO, OHIO.

CONTROL DEVICE FOR SIFTERS.

13,058. Specification of Reissued Letters Patent. Reissued Dec. 21, 1909.

Original No. 933,055, dated September 7, 1909, Serial No. 332,582. Application for reissue filed November 16, 1909. Serial No. 528,398.

*To all whom it may concern:*

Be it known that I, ALLEN C. BRANTINGHAM, a citizen of the United States, residing at Toledo, in the county of Lucas and State of Ohio, have invented new and useful Control Devices for Sifters, of which the following is a specification.

This invention relates to control of a movably mounted element, and more particularly to a device offering resistance to eccentric movements of an element.

This invention has utility when employed in the form of a fluid retarder or dash pot to limit the starting, stopping and other unbalanced movements of the driving element for the gyratory type of sifters or bolters, thereby rendering their action more uniform. In such constructions it effectually rids the machines of the flighty or uncertain wabbling movements in starting because the device, while exerting a yielding influence against lateral movements, is non-reactive in its nature. In practice there are no flighty movements at any time, for though there is perfect freedom of rotation of the controlled element, any eccentric movement, no matter how small, is resisted. As the eccentric movement increases, the drag or resistance increases, resulting in the device being quick and sure in its operation. So long as the element has no motion of translation it is unresisted by the device which is not center urging in its action but eccentric resisting, and this influence acts in a plane at an angle to the element. If, due to changes in the load or from other causes, the driver is unbalanced, its gyrations or orbital movements are minimized by this fluid control device. In fact this device serves as a constantly effective steadying means resisting all eccentric movements, whether radial or circumferential of the element which it controls, while the element at rest in any position is not affected by the device.

Figure 1:
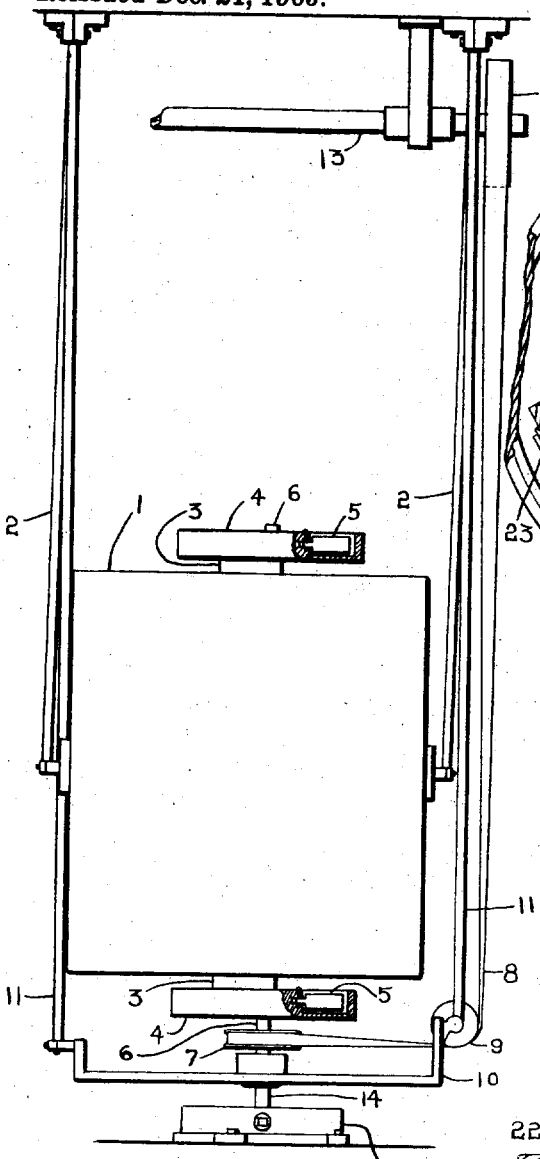
Figure 2:
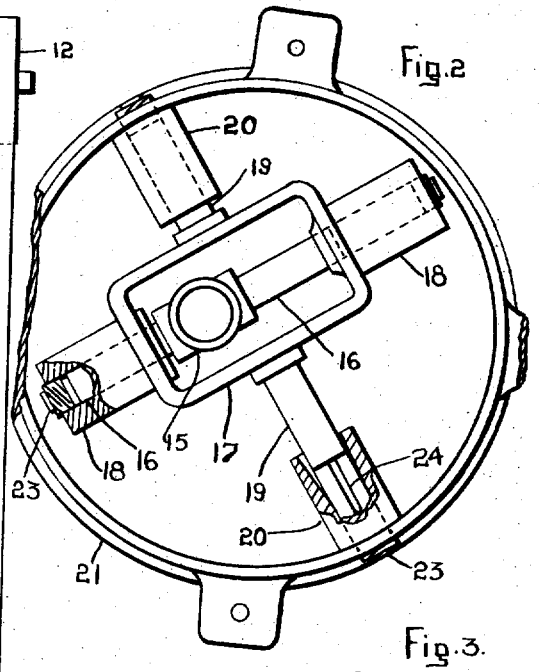
Figure 3:
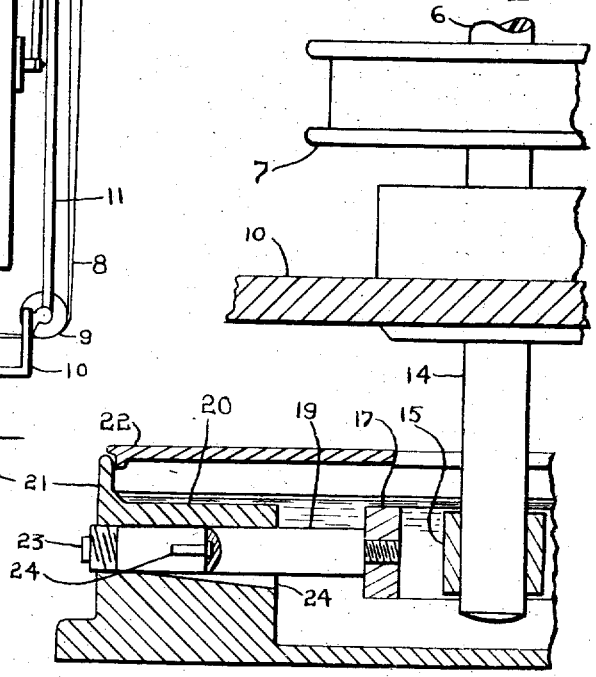

Referring to the drawings: Figure 1 is a view in side elevation of a sifter or bolter, with an embodiment of the invention adapted thereto, parts of the fly wheels of the machine being broken away to show the weights. Fig. 2 is a plan view of the device with parts broken away, and with the element receiving portion off center. Fig. 3 is a vertical section on an enlarged scale of a portion of the device.

The sifter or driven member 1 is movably suspended or supported by means of rods 2. The sifter box 1, or container for the substance or material to be treated, has concentric bearings 3 in which the fly wheels 4 are mounted eccentrically. These fly wheels have weights 5 oppositely positioned to the eccentricity of their mounting in the bearings 3. The fly wheels 4 are fixed to concentric driving shaft 6. Element 6 is the driving control means for gyrating the box or body 1, which in normal operation has for its throw length the distance of shaft 6 from the center of its bearings 3 in the body 1. This driving element or shaft 6 has a pulley 7 thereon over which travels the belt 8 passing around guide pulleys 9 carried by frame 10 suspended by rods 11. The belt or shaft actuating means 8 also passes over pulley 12 on line shaft 13 from which power is derived.

Concentric with the driving element 6 is the stud or stem 14 extending into sleeve 15. The stud 14, alined with shaft 6, is an automatically adjustable crank, the variable throws of which by its rotation at different radial distances from its normal position in the center of vessel 21, are in a plane parallel to the plane of gyration of body 1, and also parallel to the plane of movement of unbalanced weights 5. The distance of the center of crank pin 14 from the center line of bearings 3 in body 1 is the normal length of crank arm as to the driven body, while its eccentricity as to vessel 21 is the measure of its crank action in the steadying device in pumping the oil to retard throw-increasing and -decreasing movements. The sleeve 15 has a plurality of extensions or pistons 16 movable relatively to the frame 17 into chambers or cylinders 18 carried by the surrounding frame 17. Frame 17 also has opposed extensions or pistons 19 operable in cylinders 20 in the walls of the fluid containing vessel 21 having cover plate 22. The cylinders extend through the frame and vessel for convenience in assembling, and have their outer ends closed by plugs 23.

The individually-rigid pistons and cylinders are submerged in a fluid as oil, and to permit of the retarding or dash pot action, ways 24 are formed in the walls of the cylinders, which ways are so proportioned that but slight resistance is offered to eccentric movements of sleeve 15 when the movements are close to central position. However, as these eccentric movements increase in magnitude, the device is effective with increased drag action to reduce the gyrations of the element 6. This fluid steadying device is automatically adjustable to the variable throws of the control means 6 and body 1. In this device the movably mounted rigid member 15, 16, has yielding coaction with the second movably mounted rigid member 17, 18, 19, and the movements of these members are in a common plane parallel to the plane of gyration of body 1.

Operation: In starting to rotate the driving element 6, it is caused to gyrate owing to the great inertia of rest of the driven member 1, which member, body or container quickly acquires its movement due to the resisting device. In giving member 1 this movement, the steadying device, including the frame 10, stud 14 and sleeve 15, first describes an orbit or revolves about the central point of vessel 21. This travel is not rotary, as the rods 11 hold the frame 10. The device, while preventing all concussions or blows which might rack the machine or building, has such a hold on the driving element 6 as to always influence eccentric movements thereof. In pumping the liquid, oil, in and out of the cylinders, the port openings of ways 24 are automatically reduced by the pistons to further retard the flow as eccentricity increases in the direction in which the element is moving. Likewise, in coming to rest, there is a most brief period during which the sifter gyrates the element 6. Besides being so effective in starting and stopping, the influence which the device exercises constantly over the movements of element 6 causes any unbalancing to be so perfectly controlled that the gyrations of the sifter approximate at all times the regular amplitude which they are designed to have. This smoothness in operation of the machine, minimizes whip of the driving belt, thereby wasting less power and increasing the efficiency of the installation.

The idea of the invention herein disclosed is not to be limited by the drawings and description to any greater extent than the ordinary meaning of the terms of the claims demand. In other words, the elements set forth in the claims are to be interpreted broadly, giving me the advantage of equivalents in the protection of my idea.

What is claimed and it is desired to secure by Letters Patent is:

1. A gyratory sifter having an eccentrically movable driving shaft, bearings therefor, actuating means for the shaft and a submerged resistance offering control device effective as the shaft has eccentric movement.

2. A gyratory sifter comprising a container, a support for the container, a driving element or shaft for the container and a liquid steadying device for the element or shaft.

3. A gyratory sifter having a driving shaft, bearings therefor, actuating means for the shaft and liquid control means effective to resist eccentric movements of the shaft.

4. A container for the substance to be treated, a support therefor, a movably mounted rotary element or shaft for actuating the container, actuating means for the shaft and a steadying device for the shaft comprising a liquid dash pot.

5. A sifter comprising a movably mounted rotary shaft, bearings therefor, actuating means for the shaft and a plurality of liquid dash pots effective to resist eccentric movements of the shaft.

6. A sifter comprising a driven container, a support therefor, an eccentrically weighted shaft for driving the container, actuating means for the shaft and a liquid steadying device for the shaft.

7. A sifter comprising a gyratory shaft, bearings therefor, shaft actuating means and a non-reacting yielding device to limit the throw of the shaft.

8. A sifter comprising a driven container, supporting means for the container, eccentrically movable driving means for the container and a non-reacting device offering increasing resistance as the eccentric movements increase.

9. The combination with a body and means for gyrating the same, of a steadying device comprising an automatically-adjustable variable throw-crank arranged to rotate in a plane parallel to the plane of said body's gyration, and means applied to said crank for retarding the throw-increasing and throw-decreasing movements of said crank toward and from normal gyration, and which crank is arranged to control the gyratory motions of said body.

10. The combination with a body supported for gyratory motion, of a vertical shaft coacting with said body and carrying an unbalanced weight that rotates in a plane parallel to the plane of said body's gyration, a steadying device comprising an automatically-adjustable variable throw-crank, and means for retarding both the throw-increasing and throw-decreasing movements of said crank toward and from normal gyration, and which crank is arranged to control the gyratory motions of said body.

11. The combination with a body supported for gyratory motion of a control means for the gyratory motions of said body, and a steadying device automatically adjustable to the variable throws of the control means and comprising a pair of movably mounted rigid members having yielding coaction with each other, said members being arranged in a plane parallel to the plane of said body's gyration for retarding the throw-increasing and throw-decreasing movements of the control means, thus permitting the device to automatically adjust itself to the variable throws of the control means and steady the gyratory motions of said body.

12. The combination with a body and means for gyrating the same, of a steadying-device comprising an automatically-adjustable variable throw crank arranged to rotate in a plane parallel to the plane of said body's gyration, and a fluid-cushioned retarding device incorporated in said crank, and which crank is arranged to control the gyratory motions of said body.

13. The combination with a body and means for gyrating the same, of a steadying-device comprising an automatically-adjustable variable throw-crank having a double-ended fluid cushioned retarding device incorporated as a part of said crank, and arranged to control the adjustments of said crank in both directions, and which crank is arranged to control the gyratory motions of said body.

14. The combination with a body and means for gyrating the same, of a steadying device comprising an automatically-adjustable variable throw-crank having a fluid cushioned cylinder and piston retarding device incorporated as a part of said crank, and which crank is arranged to control the gyratory motions of said body.

15. A gyratory sifter comprising a container, a support for the container, a driving element or shaft for the container and a fluid steadying device for the element or shaft.

16. A gyratory sifter having a driving shaft, bearings therefor, actuating means for the shaft and fluid control means effective to resist eccentric movements of the shaft.

17. A container for the substance to be treated, a support therefor, a movably mounted rotary element or shaft for actuating the container, actuating means for the shaft and a steadying device for the shaft comprising a fluid dash pot.

18. A sifter comprising a driven container, a support therefor, an eccentrically weighted shaft for driving the container, actuating means for the shaft and a fluid steadying device for the shaft.

19. The combination with a body and means for gyrating the same, of a fluid-cushioned steadying-device arranged to restrict the gyratory motions of said body.

20. The combination with a body and means for gyrating the same, of a revoluble fluid-cushioned steadying device arranged to restrict the gyratory motions of said body.

21. The combination with a sifter and means for gyrating the same, of a revoluble fluid-cushioned steadying device arranged to restrict the gyratory motions of said sifter.

22. The combination with a gyratory sifter mechanism having a stem, of a steadying device, including radial and circumferential travel resistance members, engaging the stem to limit its orbital travel and so control, a plurality of said members being movable to slidably engage each other during abnormal operation and thereby bring about the controlling of the mechanism.

23. The combination with a self balancing mechanism comprising a container for the substance to be treated, a gyrator for the container, and a stem coacting with the mechanism and movable in an orbit, of a steadying device consisting of individually-rigid circumferential travel resistance members for controlling the stem, one of said members being movable to slidably engage another to resist abnormal travel of the mechanism.

24. The combination with a sifter and a gyrator to actuate the sifter in a plane, of mechanism coacting therewith and permitting abnormal travel of the sifter, said mechanism consisting of individually-rigid relatively movable members confined to travel parallel to the plane of gyration of the sifter, the coacting of said members being in intersecting directions during abnormal gyration.

25. The combination with a self balancing sifter and an independently supported gyrator therefor causing the sifter to travel in a plane, of a laterally coacting steadying device for the sifter consisting of individually-rigid relatively movable members confined to travel parallel to the plane of gyration of the sifter to resist abnormal travel of the sifter.

26. The combination with a self balancing mechanism comprising a body supported for gyration, and a gyrator for the body, of a steadying device for the body including members reciprocable in intersecting directions and interposed resistance offering means coacting to yieldingly oppose abnormal gyration of the mechanism.

27. The combination with a self balancing mechanism comprising a body supported for gyration, and a gyrator for the mechanism, of a steadying device comprising reciprocable non-rotative members and coacting means for the members to minimize abnormal movements of the mechanism and thereby cause the mechanism in operation to approximate uniform gyration.

28. The combination of a body supported for gyration, a gyrator for the body, and a steadying device including an orbitally movable member, a reciprocable member and a fixed member, provided with means coacting to restrain abnormal movement of the body and thereby cause the body in operation to approximate uniform gyration.

In testimony whereof I affix my signature in the presence of two witnesses.

ALLEN C. BRANTINGHAM.

Witnesses:
GERTRUDE A. DELANEY,
GEO. E. KIRK.